April 23, 1968  J. C. WOLLARD ET AL  3,378,868
CONVEYANCE LOADER
Filed July 6, 1965  6 Sheets-Sheet 1
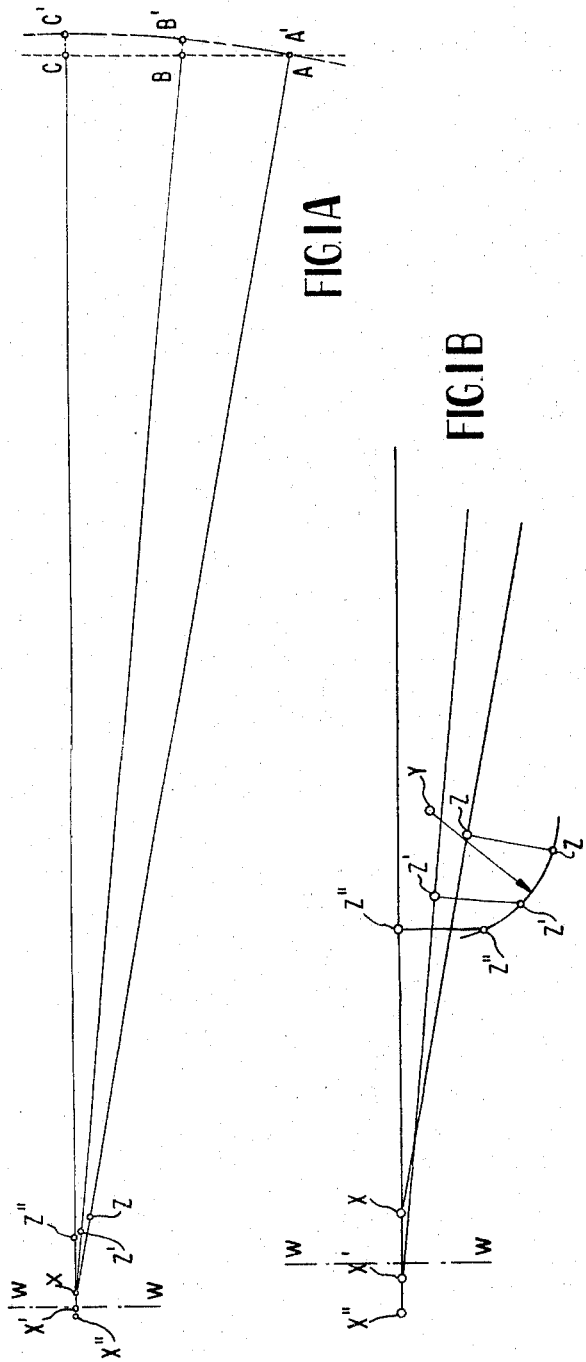
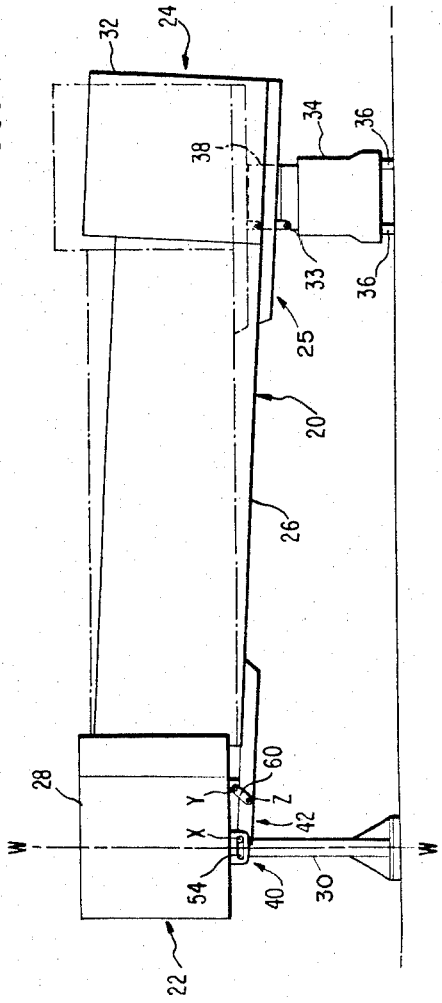
INVENTORS
JOSEPH C. WOLLARD
JOHN S. SLANEY
ANDREW G. SEIPOS
BY  *Shanley and O'Neil*
ATTORNEYS

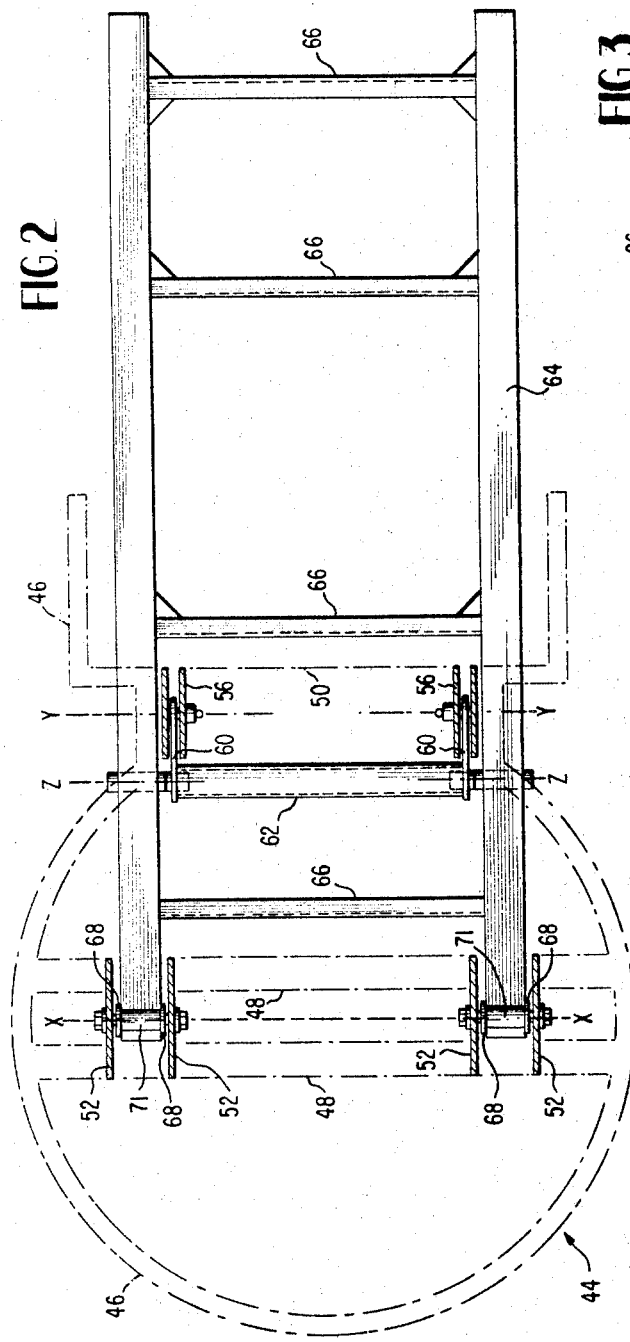
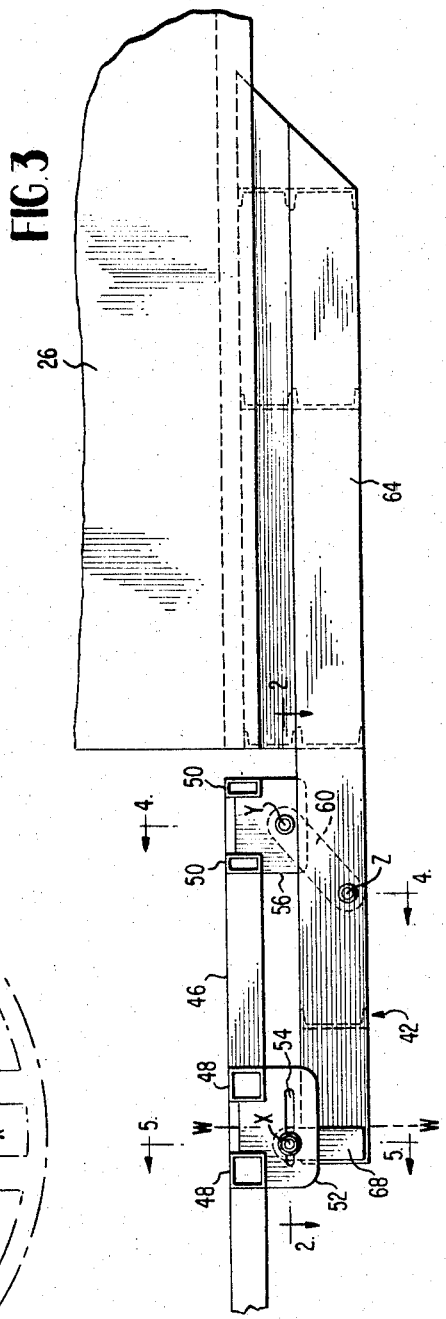

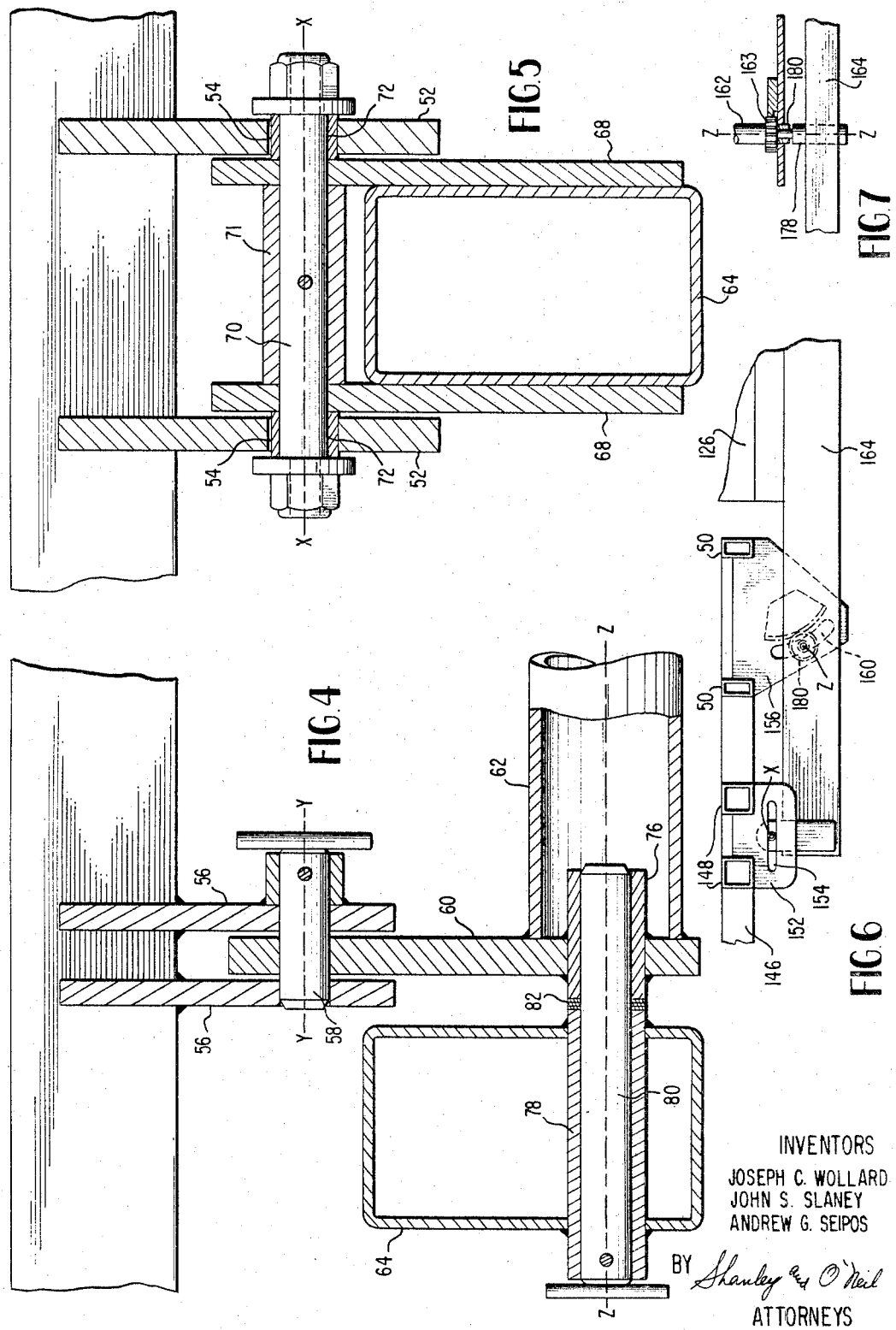

INVENTORS
JOSEPH C. WOLLARD
JOHN S. SLANEY
ANDREW G. SEIPOS

BY *Shanley and O'Neil*

ATTORNEYS

April 23, 1968         J. C. WOLLARD ETAL         3,378,868
                        CONVEYANCE LOADER
Filed July 6, 1965                             6 Sheets-Sheet 5

INVENTORS
JOSEPH C. WOLLARD
JOHN S. SLANEY
ANDREW G. SEIPOS

BY  *Shanley and O'Neil*

ATTORNEYS

United States Patent Office 3,378,868
Patented Apr. 23, 1968

3,378,868
CONVEYANCE LOADER
Joseph C. Wollard, Miami Springs, John S. Slaney, Opa-Locka, and Andrew G. Seipos, Miami, Fla., assignors to Wollard Aircraft Service Equipment Inc., a corporation of Florida
Filed July 6, 1965, Ser. No. 469,546
10 Claims. (Cl. 14—71)

ABSTRACT OF THE DISCLOSURE

Mechanical coupling device for conveyance loaders which are pivoted at a terminal end and swingable in a vertical plane at the conveyance end, the coupling device acting between the loader passageway and an end support for positively moving the loader passageway longitudinally in response to swinging movement to give desired spatial movement of a desired point on the loader remote from the terminal.

---

This invention relates to conveyance loaders and particularly to conveyance loaders having a pivoted end at fixed height and a swingable end which is at least vertically movable to position a portion contiguous to conveyance entrances of varying heights relative to the pivoted end.

In some of these loaders, for various reasons, with upward and downward movement of the conveyance end, the coveyance engaging portion should follow a vertical line or remain within a vertical plane. In other loaders, the passageway connecting the ends is supported at a point intermediate the entry end and the conveyance end with the supporting structure being of a nature such that the portion of the loader at the support must follow a vertical line or remain within a vertical plane on upward and downward movement of the conveyance end of the loader. Still other loaders require that a point of rolling contact between a support wheel and the pivot point of horizontal swing movement of the loader remain at all times equal.

Copending patent application Ser. No. 357,358, filed Apr. 6, 1964 by Joseph C. Wollard, John S. Slaney and Lester L. Preiss abandoned in favor of continuation application Ser. No. 619,483, filed Feb. 28, 1967, now Patent No. 3,341,875, discloses that a rolling pivot may be introduced at one end of a loader to accommodate the desired vertical line or plane movement of the conveyance end. This made possible relative movement of the passageway end supports and relieved the previous destructive stresses on the loader structure but it still resulted in some lateral thrust being exerted against the vertical moving elements to accomplesh the necessary rolling action of the pivot at the fixed elevation end of the passageway. Additionally a structural weakness herein termed lateral instability is an inherent fault of this rolling support since the support points on either side of the passageway can move independently of one another due to the necessity of providing the tracks on either side of the passageway for the rolling action.

An objective of the present invention is to eliminate all destructive thrust on critical points which result from pivotal movement in a rolling pivot loader.

Another objective of the present invention is to obtain lateral stability of the vertical movement hinge connection of a rolling pivot loader.

The desired end is achieved through a simple mechanical force transmitting system which constrains the loader rolling pivot to a predetermined movement longitudinally of the passageway to cause vertical line or vertical plane movement of the desired portion of the loader remote from the entry end or to maintain a point on the loader remote from the entry end equidistant from the vertical movement hinge point. A lateral stabilizing effect may be built into the force transmitting system by having synchronized action on both sides of the longitudinal axis of the loader.

The invention will be more readily understood from consideration of the accompanying drawings in conjunction with the following detailed description.

FIGURE 1 is a diagrammatic view of a loader incorporating the present invention;

FIGURES 1A and 1B are diagrammatic figures explanatory of the manner in which apparatus embodying the present invention can be incorporated in the loader illustrated in FIGURE 1;

FIGURE 2 is an enlarged fragmentary plan view in section taken on the line 2—2 of FIGURE 3 with some parts shown in phantom;

FIGURE 3 is an enlarged fragmentary view in side elevation of the fixed elevation end of the loader of FIGURE 1;

FIGURE 4 is an enlarged fragmentary view in section taken on the line 4—4 of FIGURE 3;

FIGURE 5 is an enlarged fragmentary view in section taken on the line 5—5 of FIGURE 3;

FIGURE 6 is a fragmentary view in elevation similar to FIGURE 3 of a modification of the present invention;

FIGURE 7 is a fragmentary plan view with parts in section of the structure illustrated in FIGURE 6;

Figure 8:
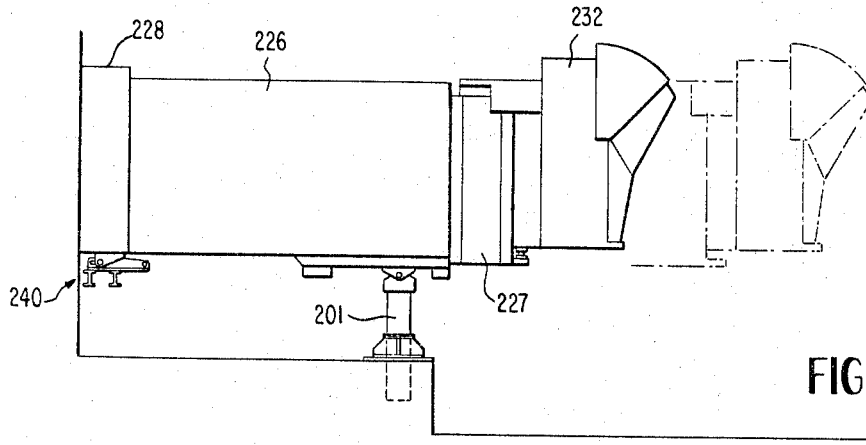
FIGURE 8 is a view in side elevation of another type of loader incorporating another modification of the present invention.

Referring to FIGURES 1 to 5, inclusive, reference numeral 20 indicates generally a loader of the type illustrated and described in copending patent application Ser. No. 326,771, filed Nov. 29, 1963 in the name of Joseph C. Wollard, John S. Slaney and Lester L. Preiss now U.S. Patent No. 3,315,291 having a fixed elevation or terminal end indicated generally at 22 adapted to be contiguous to a terminal building or an extension projecting from a terminal building and a conveyance end indicated generally at 24 designed to register with the entrance of a conveyance or with a longitudinal or lateral extension which serves a conveyance, in the present case an airplane. Connecting the two ends is an elongated passageway 26. At the terminal end is a terminal or entry vestibule 28 supported on pedestal 30 for rotation or swing through 180° around a vertical axis W—W. At the conveyance end is a conveyance vestibule 32 and a mounting structure indicated generally at 25, pivotally supported at 33 on an undercarriage 34 which is self-propelled by wheels 36 in a 180° arc of a circle over the pavement of the loading area. Undercarriage 34 includes elevating structure 38 for raising and lowering the conveyance end of the loader. This vertical pivotal movement of the loader takes place around a horizontal axis X—X and is made possible by the rolling pivotal conection indicated generally at 40 between the end of a yoke or mounted structure indicated generally at 42 on passageway 26 and the upper portion of pedestal 30.

Referring now specifically to FIGURES 2 to 5, inclusive, a supporting framework indicated generally at 44 is mounted for rotation around axis W—W on pedestal 30 by turntable structure, not illustrated. Supporting framework 44 includes a peripheral structural member 46 and two sets of transverse structural members 48 and 50, respectively. Depending from structural members 48 are plates 52 whose function is to support the terminal end of the passageway by means of a rolling pivotal connection acting in slots 54. Depending from structural members 50 and plates 56 incorporating fixed pivot pins 58 which in turn pivotally support link arms 60. The axes of pins 58 coincide with a common axis Y—Y. The free ends of link arms 60 are rigidly connected to torque tube 62 which thereby constrains the link arms to synchronous movement around pivot pins 58 and axis Y—Y.

Passageway 26 incorporates at the terminal end structural members 64 braced by transverse members 66 which extend beyond the end of the passageway and under the terminal to form a yoke indicated generally at 42 as mentioned above for suspended connection with plates 52 of supporting platform 44. This connection is made with each member 64 through two plates 68 attached at the end of the structural member 64, these plates being spaced apart by a tube 69 carrying a fixed shaft 70 which extends through slots 54. Carried on each shaft 70 are roller bearings 72 designed to give both rolling and pivotal action between slots 54 and shaft 70. The axes of shafts 70 coincide with a common axis X—X.

In order to bring about controlled movement of yoke 42 longitudinally of the passageway directly responsive to vertical movement of the conveyance end of the loader, link arms 60 are of predetermined length and have a critical point of pivotal connection with structural member 64. The structure involved in this critical connection comprises in this embodiment a pivot pin bearing tube 76 fixed in each link arm 60 in coaxial relation with torque tube 62 and a coacting pivot pin supporting tube 78 fixed in each structural member 64. Passing through the pivot pin bearing and supporting tubes and rigidly connected to each supporting tube 78 is a pivot pin 80. The axes of pivot pins 80 coincide with a common axis Z—Z. Bearing material 82 is interposed between the adjacent end of the coacting tubes 76 and 78.

In operation of this type of loader and assuming pivot pins 80 are not in place so that link arms 60 and torque tube 62 are hanging loose on shafts 58, upon occurrence of the upward and downward movement of conveyance vestibule 24 required to register with different height plane doorways and to accommodate the up and down movement of each plane as it is unloaded and loaded, undercarriage 34 will resist any movement other than horizontal swinging movement in the arc for which it is designed. This means that the resistance of undercarriage 34 to movement will set up forces which will tend to cause rolling pivot 72 to move backward and forward in slot 54. However any resistance to this rolling motion of roller bears 72 will strain the connection at 33 between the conveyance end of the loader and the undercarriage. This strain will in turn be transmitted to the parts supporting pivotal connection 33. Additionally, all lateral forces applied to the conveyance end of the loader, such as that resulting from movement of self-propelled undercarriage 34 through its predetermined arc, will tend to force the roller bearings on one side of the yoke 42 in one direction in their slots and the roller bearings on the other side of yoke 42 in the opposite direction in their slots due to frictional resistance of the terminal vestibule turntable to such turning movement. This in turn will place objectionable stresses and strains on the entire terminal end passageway suspension construction. This potential collective weakness of the rolling pivot construction is herein termed lateral instability.

With one simple compact structural device, the present invention eliminates the foregoing difficulties. This is accomplished in this embodiment by the provision of properly dimensioned link arms 60 and the proper positioning of axes Y—Y and Z—Z. Thus with pins 80 in place in tubes 76 and 78, movement of the conveyance end of the loader brings about the necessary degree of rolling movement of rolling pivotal connection 40 so as to maintain upward and downward movement of the conveyance vestibule in a vertical straight line, or in a vertical plane if the undercarriage should be moving at the same time. As the rolling pivot 40 is constrained by link arms 60 and pivot points 58 and 74 to move the required distance, torque tube 62 simultaneously prevents any tendency of the rolling pivot on each side of the yoke 42 to move out of axial alignment with the other. Just as important, during swinging movement of the loader in a horizontal plane as the self-propelled undercarriage moves in its predetermined arc and with no movement of the loader around rolling pivot 40 in a vertical plane, torque tube 62 rigidifies the rolling pivot system against lateral instability. This same function of torque tube 62 of course resists any lateral force applied at any time to the loader, such as a wind load.

The relative positions of the axes X—X, Y—Y and Z—Z, including of course the length of each link arm 60 governs the coaction of the critical components of the present invention to achieve the desired results. The relative positions of these axes (considered points for convenience when viewed from the side, as in FIGURE 1) can be determined in a satisfactory manner by conventional engineering practices to achieve satisfactory results in the field. It is not necessary that an absolutely vertical straight line motion of hinge point 33 be achieved since with the lengths of the passageways of various loaders, being great relative to potential departure from straight line movement of hinge point 33, some slight departure from the theoretical can be accommodated by the manufacturing tolerances of the parts.

For simplicity of disclosure a graphical method of arriving at the relative positions of axes X—X, Y—Y and Z—Z will be described below to illustrate the critical relationship of the components, but once the relationships present are made known other more accurate and involved methods will be apparent to those skilled in the art.

FIGURES 1A and 1B serve to illustrate this method when taken in conjunction with FIGURE 1.

To start with, axis Y—Y is located on the supporting frame 46 as far as practicable toward the conveyance end of the loader. Considering the vertical pivotal movement of the loader and the fact that axis Z—Z must fall within the limits of the structural member 64, the limits in length of link arm 60 are dictated. In practice, as a matter of economy, plates 60 forming the link arms can be of uniform construction despite the varying lengths of loaders, as will be evident. Axis X—X is set near the conveyance end of slot 54 when the loader is at the lowermost point of its vertical movement, with the slot being longer than the greatest amount of travel of axis X—X on upward movement of the conveyance end of the loader.

In FIGURE 1A the letters A, B and C represent three positions of hinge point 33 of FIGURE 1 as the conveyance end of a loader is raised. The letter X indicates the position of axis X—X with the loader in the lowermost position, X' the position of the axis X—X with the conveyance end of the loader at B, and X" the position of the axis X—X with the conveyance end of the loader at C. It will be apparent that if axis X—X is held stationary as the loader is raised from the lowest position, points B and C will assume the positions of points B' and C', respectively. This in turn means that the axis X—X must move to the left the horizontal distance B–B' and the horizontal distance C–C' in order to maintain movement of the conveyance end of the loader in a vertical line. Thus, the three positions of the loader with the conveyance end moving in a vertical straight line would be X–A, X'–B and X"–C. The location of point Z along X–A, X'–B and X"–C can be graphically pictured in FIGURE 1A as being at points Z, Z' and Z", respectively. Given the length of link arm 60, point Y can be located from points Z and Z" by the elementary method of intersecting arcs having a radius equal to the length of the link arm. Point Z' will not fall precisely on an arc around point Y which touches points Z and Z" but the departure from theoretical will be negligible in practice.

Point Y has not been shown in FIGURE 1A because normally its location as arrived at by the above method will locate point Y in space above framework 44. This is due to the fact that the phantom lines of FIGURE 1A in passing from point X to points A, B and C position point Z in space above structural member 64. The actual desired location of point Z in structural member 64 is arrived at as shown in FIGURE 1B by dropping perpendiculars below phantom lines X–A, X'–B and X"–C the desired distance. Final points Z, Z' and Z" as shown in FIGURE 1B, lie on an arc from which can be calculated the desired location of point Y or, as in the present description, the arbitrary length of link arm 60 can determine point Y by intersecting scribed arcs.

Instead of using link arms 60 and torque tube 62 to carry out the present invention, the apparatus illustrated in the embodiment of FIGURES 6 and 7 can be utilized. In this modification a point Z on framework 164 is constrained to move in a manner similar to that described for point Z of the preceding modification. This is accomplished by means of a slot 160 cut in a plate 156 having camming surfaces acting on a roller bearing 180 carried by fixed shaft 178 mounted in structural member 164. Slot 160 has arcuate camming surfaces the shape of which is arrived at as described above. Obviously plate 156, slot 160 and roller bearing 180 act as linking means with roller bearing 180 being connected to framework or mounting structure 164 by fixed shaft 178. In place of torque tube 62 of the preceding embodiment a torque shaft 162 turned by coacting rack and pinion 163 converts movement of point 174' along slot 160 into rotary movement which is transmitted to identical rack, pinion and slot means on the other side of the loader.

Figure 9:
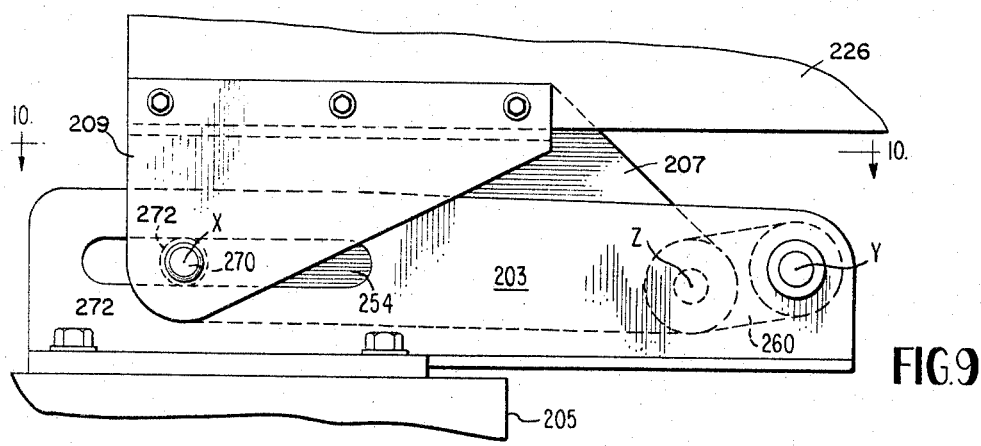
FIGURE 9 is an enlarged fragmentary view in elevation of a portion of FIGURE 8.
Figure 10:
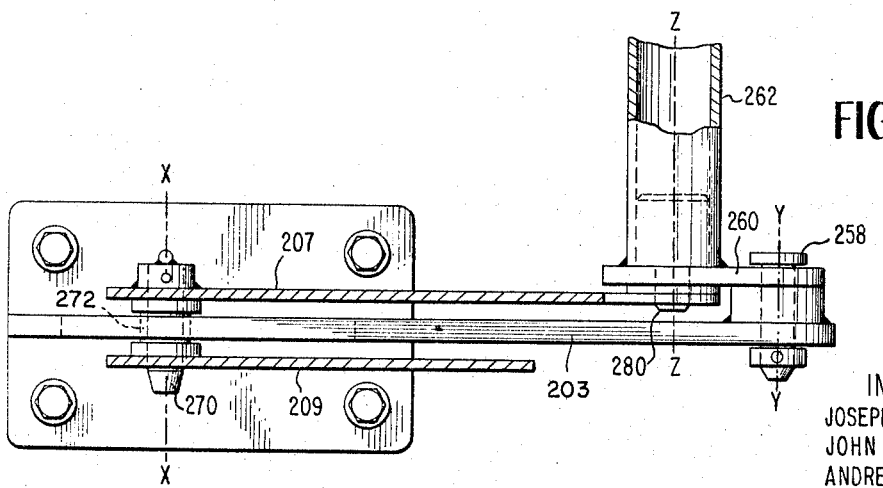
FIGURE 10 is a fragmentary view in section taken on the line 10—10 of FIGURE 9.
Figure 11:
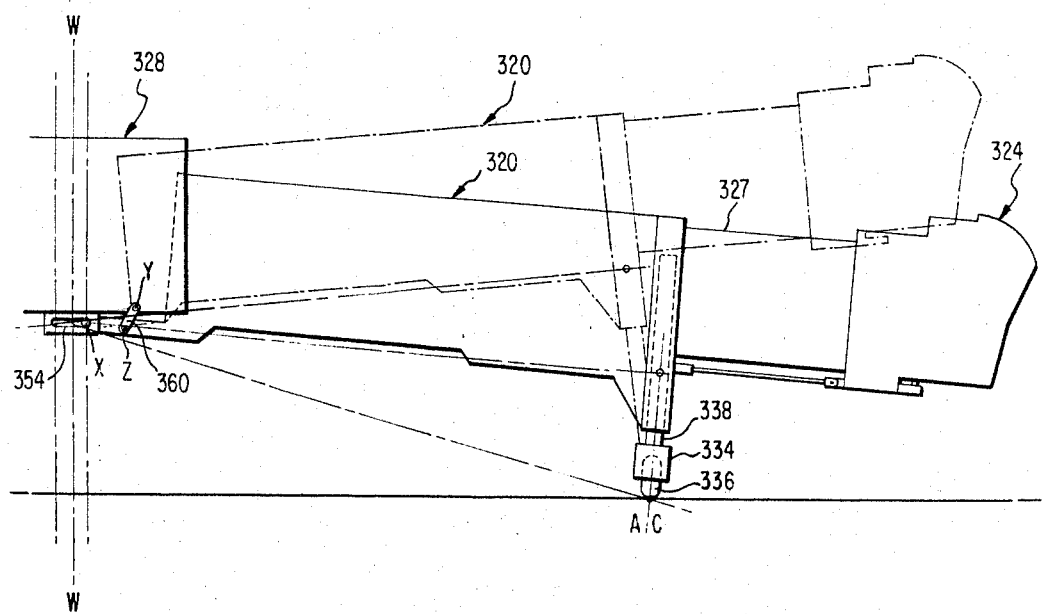
FIGURE 11 is a diagrammatic view of another form of loader incorporating the present invention.
Figure 12:
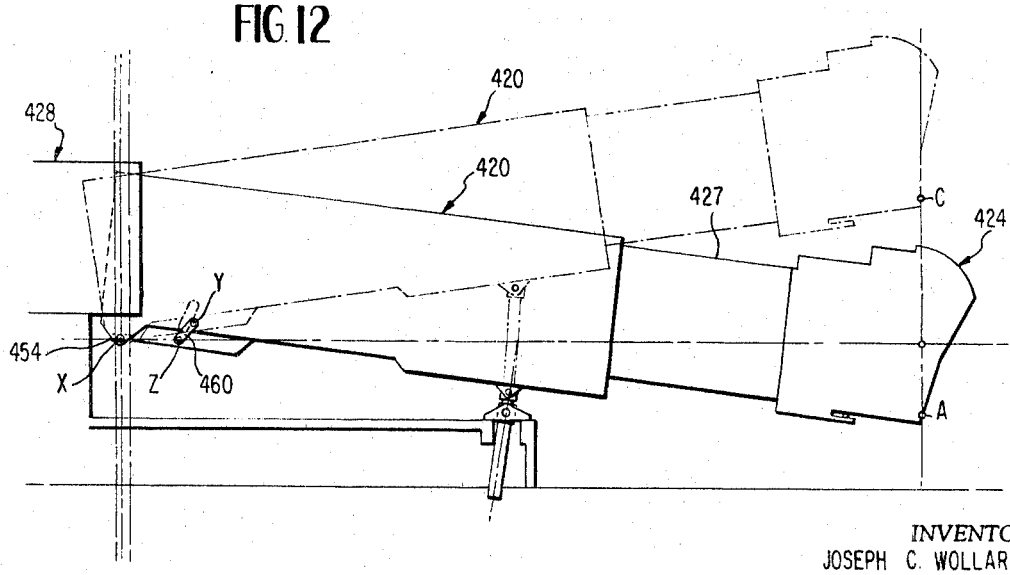
FIGURE 12 is a diagrammatic view of another form of loader incorporating the present invention.
Figure 13:
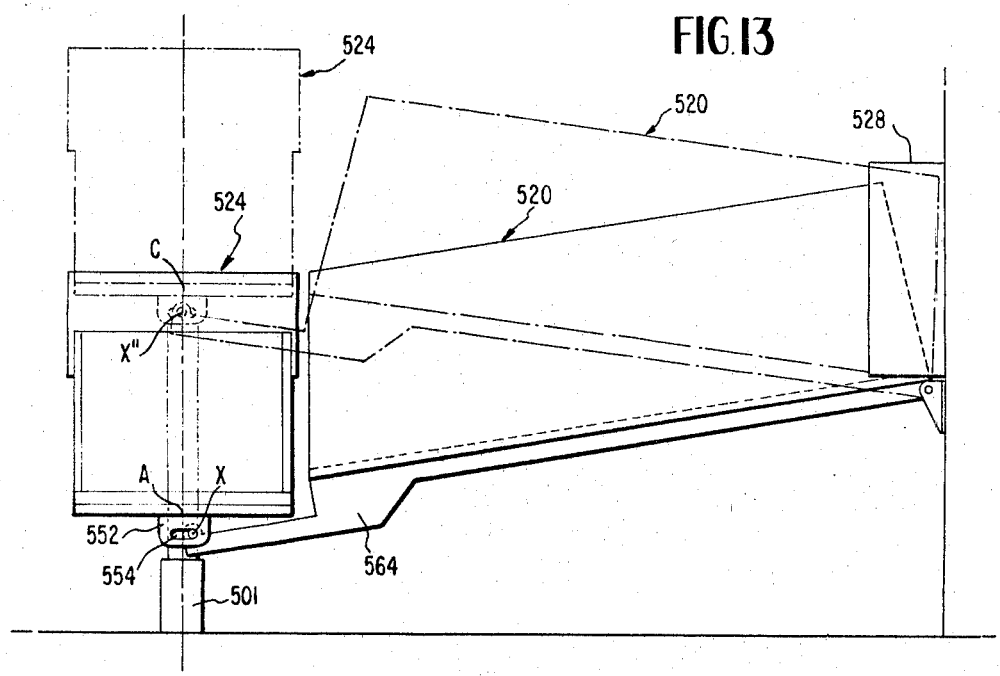
FIGURE 13 is a diagrammatic view of another form of loader incorporating the present invention.
Figure 14:
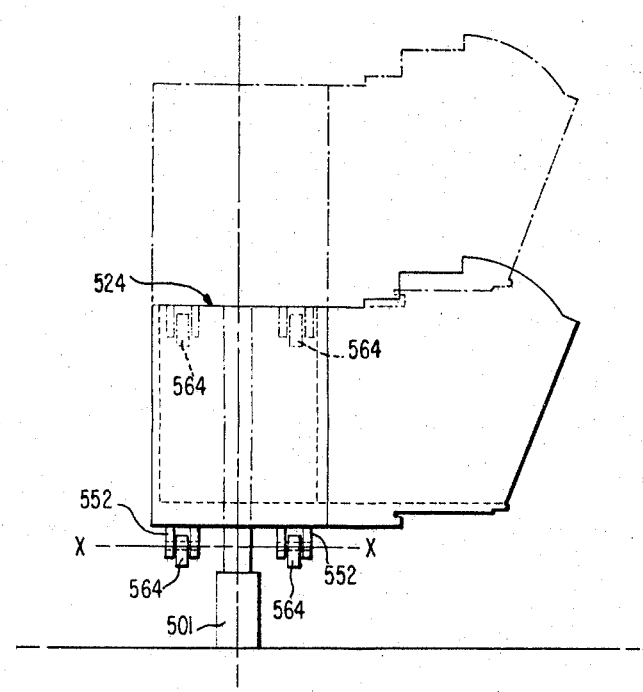
FIGURE 14 is a diagrammatic end view of the loader illustrated in FIGURE 13.

The modification illustrated in FIGURES 8 through 10 inclusive is directed to those loader constructions where for compactness or any other desired reason it is desired to bring the operating parts of the present invention into close proximity to one another. In this modification, in order to simplify the description the same reference numerals are used as in the embodiment illustrated in FIGURES 1 to 5 inclusive but increased by 200.

In this type loader, a passageway 226 may have a telescoping section 227 carrying a conveyance vestibule 232. The conveyance end of passageway 226 is raised and lowered by means of a vertically acting hydraulic mechanism 201 and the loader pivots vertically around rolling pivotal connection 240 at the terminal end of the passageway. In view of the nature of hydraulic mechanism 201 there is no horizontal swinging movement present in this type loader and this results in a simplification of the structure 228 at the terminal end of the passageway 226.

In this modification compactness of the structure of the invention is achieved by inverting the structure and incorporating the slot 254 and the link arm fixed pivot in a single plate 203 affixed to a foundation member 205. The terminal end of passageway 226 therefore carries a roller bearing 272 on a shaft 270 fixedly mounted in spaced depending plates 207 and 209. The conveyance end of plate 207 rotatably receives shaft 280 which is rigidly received in torque tube 262. The remainder of this structure will be obvious from the reference numerals in the light of the description of the embodiment of FIGURES 1 to 5 inclusive. It will be noted that the link arm 260 in this compact arrangement is much reduced in length.

Consideration of the loader of FIGURE 1 and the loader of FIGURE 8 will show that the terminology "conveyance end of the passageway" does not necessarily mean contiguity with the conveyance but rather the end of the passageway away from the terminal.

The heart of the present invention resides in the provision of loader apparatus which has a portion incorporating a point which must move in a vertical line or plane. To illustrate the scope of the invention, further environments in which this problem occurs, the needs of which are satisfied by the present invention, FIGURES 11, 12, 13 and 14 are included in the drawings. In each case the lowermost position of the loader is indicated in solid lines and the higher positions in broken lines. Application of the present invention to the types of loaders illustrated in FIGURES 11–14 will be obvious from the foregoing description and from the reference numerals in FIGURES 11–14 inclusive which in respect to each modification correspond to those already used in connection with FIGURES 1–10 inclusive but are increased in each case by 100.

It will be noted that in all embodiments of the present invention a fixed point on the conveyance end of the loader (e.g. pivot point 33 in FIGURE 1, the point of contact between wheel 336 and the apron in FIGURE 11 and the extreme end of the loader in FIGURE 12) are maintained equidistant (W–A, W–B, W–C) from a fixed vertical reference line W—W passing through the first supporting means.

In this specification and appended claims the terminology "terminal end" means a portion of the loader on the terminal building end but not necessarily contiguous to the terminal building and the terminology "conveyance end" means on the conveyance end of the loader but not necessarily contiguous to the conveyance. In either case there may be additional loader apparatus interposed between the terminal end and the terminal building and between the conveyance end and the conveyance.

We claim:
1. A conveyance loader comprising:
 (a) means forming an elongated passageway having a terminal end including mounting structure and a conveyance end including mounting structure,
 (b) first supporting means for supporting the terminal end mounting structure of the passageway means at a point of constant vertical elevation,
 (c) second supporting means for supporting the conveyance end mounting structure of the passageway means for vertical swinging movement of the passageway means relative to the point of support of the passageway means at the terminal end mounting structure,
 (d) first pivot means between one end mounting structure and one of the supporting means for accommodating the relative movement of the passageway means and said one of the supporting means in the upward and downward swinging movement of the passageway means,
 (e) second pivot means between the other end mounting structure and the other supporting means for accommodating the relative movement of the passageway means and the other supporting means in the upward and downward swinging movement of the passageway means,
 (f) means associated with the said one of the supporting means providing for horizontal movement of the first pivot means relative to said one of the supporting means in the direction of the longitudinal dimension of the passageway means,
 (g) linking means,
 (h) means associated with linking means (g) for con- necting the linking means to an immovable point relative to said one of the supporting means, and (i) means spaced from the connecting means (h) associated with linking means (g) for connecting the linking means to said one end mounting structure, (j) the location of connecting means (h) and (i) relative to each other and to first pivot means (d) being such as to cause linking means (g) to constrain the first pivot means (d) to controlled horizontal movement relative to said one of the supporting means in response to upward and downward movement of the conveyance end of the passageway means to thereby maintain a predetermined fixed point on the conveyance end of the loader at a constant distance from a fixed vertical reference line passing through the first supporting means during vertical swinging movement of the conveyance end of the passageway means.

2. The combination claimed in claim 1 in which the said one of the supporting means is the first supporting means.

3. The combination of claim 1 in which the first pivot means rotate around a horizontal axis and means are associated with the linking means for confining the movement of the first pivot means to a straight line normal to the axis of the pivot means.

4. The combination of claim 1 in which the first pivot means and means (f) associated with said one of the supporting means comprise rolling pivot bearing means and coacting elongated horizontal bearing surface means respectively.

5. The combination of claim 4 in which the said one of the supporting means is the first supporting means.

6. The combination of claim 4 in which the first pivot means rotate around a horizontal axis and means are associated with linking means (g) for confining the movement of the rolling pivot bearing means to movement in alignment with the elongated surface means.

7. The combination claimed in claim 4 in which the first supporting means include a third pivot means mounting the passageway means for horizontal swinging movement and the second supporting means include an undercarriage supporting the conveyance end of the passageway means for the horizontal swinging movement around the third pivot means.

8. The combination of claim 1 in which:
(a) the passageway means has a longitudinal axis extending from end to end,
(b) the linking means (g) comprise substantially identical linking means disposed on each side of and spaced from the longitudinal axis,
(c) connecting means (h) comprise a connection between each linking means and a fixed point relative to said one of the supporting means on each side of the longitudinal axis,
(d) connecting means (i) of claim 1 comprise a connection between each linking means and said one end mounting structure on each side of the longitudinal axis,
(e) the connections between each substantially identical linking means and the associated mounting structure and supporting means on each side of the longitudinal axis lie in a reference plane, the reference planes being parallel to one another, and
(f) means act between the substantially identical linking means to constrain the linking means to identical movement.

9. The combination of claim 8 in which said one supporting means is the first supporting means.

10. The combination claimed in claim 9 in which the first supporting means include a third pivot means mounting the passageway means for horizontal swinging movement and the second supporting means includes an undercarriage supporting the conveyance end of the passageway means for the horizontal swinging movement around the third pivot means.

References Cited

UNITED STATES PATENTS

| 2,581,293 | 1/1952 | Read et al. | 14—72 |
| 2,626,411 | 1/1953 | Palmer | 14—71 |
| 3,263,254 | 8/1966 | Wollard et al. | 14—71 |

JACOB L. NACKENOFF, *Primary Examiner.*